(12) United States Patent
Caine et al.

(10) Patent No.: US 9,142,052 B1
(45) Date of Patent: Sep. 22, 2015

(54) GENERATING MULTIPLE DIGITAL IMAGES WITH CHANGED ASPECT RATIO

(71) Applicant: priceline.com Incorporated, Norwalk, CT (US)

(72) Inventors: John Caine, Fairfield, CT (US); Jonathan Taylor, Ridgefield, CT (US)

(73) Assignee: Priceline.com, Inc., Norwalk, CT (US)

( * ) Notice: Subject to any disclaimer, the term of this patent is extended or adjusted under 35 U.S.C. 154(b) by 153 days.

(21) Appl. No.: 13/833,680

(22) Filed: Mar. 15, 2013

(51) Int. Cl.
G06K 9/32 (2006.01)
G06T 11/60 (2006.01)
G06T 3/40 (2006.01)

(52) U.S. Cl.
CPC .. *G06T 11/60* (2013.01); *G06T 3/40* (2013.01)

(58) Field of Classification Search
None
See application file for complete search history.

(56) References Cited

U.S. PATENT DOCUMENTS

| | | | |
|---|---|---|---|
| 5,664,110 A | 9/1997 | Green et al. | |
| 5,724,520 A | 3/1998 | Goheen | |
| 5,987,440 A | 11/1999 | O'Neil et al. | |
| 6,087,956 A | 7/2000 | Helferich | |
| 6,094,640 A | 7/2000 | Goheen | |
| 6,097,941 A | 8/2000 | Helferich | |
| 6,233,430 B1 | 5/2001 | Helferich | |
| 6,253,061 B1 | 6/2001 | Helferich | |
| 6,259,892 B1 | 7/2001 | Helferich | |
| 6,459,360 B1 | 10/2002 | Helferich | |
| 6,462,646 B2 | 10/2002 | Helferich | |
| 6,636,733 B1 | 10/2003 | Helferich | |
| 6,696,921 B2 | 2/2004 | Helferich | |
| 6,826,407 B1 | 11/2004 | Helferich | |
| 6,983,138 B1 | 1/2006 | Helferich | |
| 7,003,304 B1 | 2/2006 | Helferich | |
| 7,039,428 B1 | 5/2006 | Helferich | |
| 7,146,157 B2 | 12/2006 | Helferich | |
| 7,155,241 B2 | 12/2006 | Helferich | |
| 7,242,951 B2 | 7/2007 | Helferich | |
| 7,277,716 B2 | 10/2007 | Helferich | |
| 7,280,838 B2 | 10/2007 | Helferich | |
| 7,376,432 B2 | 5/2008 | Helferich | |
| 7,403,787 B2 | 7/2008 | Helferich | |
| 7,499,716 B2 | 3/2009 | Helferich | |
| 7,627,305 B2 | 12/2009 | Helferich | |
| 7,835,757 B2 | 11/2010 | Helferich | |

(Continued)

OTHER PUBLICATIONS

"Understanding resizing, resampling, and cropping images | Photoshop, Photoshop Elements", 2011 https://myreez.wordpress.com/2011/04/25/understanding-resizing-resampling-and-cropping-images-photoshop-photoshop-elements/.*

*Primary Examiner* — Li Liu
(74) *Attorney, Agent, or Firm* — Hickman Palermo Becker Bingham LLP

(57) ABSTRACT

In an embodiment, a data processing method comprises receiving and storing one or more original graphic image files; for each particular original graphic image file among the graphic image files: determining a first aspect ratio of the particular original graphic image file; determining whether the first aspect ratio is wider, taller, or identical to a specified second aspect ratio associated with one or more target image files; creating and storing the one or more target image files each having the second aspect ratio, by re-sampling the particular original graphic image file to match a first dimension of the one or more target image files, and selectively cropping one or more portions of the particular original graphic image file to form the one or more target image files having the second aspect ratio; wherein the method is performed using one or more computing devices.

18 Claims, 5 Drawing Sheets

(56) References Cited

U.S. PATENT DOCUMENTS

| | | |
|---|---|---|
| 7,843,314 B2 | 11/2010 | Helferich |
| 7,957,695 B2 | 6/2011 | Helferich |
| 8,099,046 B2 | 1/2012 | Helferich |
| 8,107,601 B2 | 1/2012 | Helferich |
| 8,116,741 B2 | 2/2012 | Helferich |
| 8,116,743 B2 | 2/2012 | Helferich |
| 8,134,450 B2 | 3/2012 | Helferich |
| 8,195,569 B2 | 6/2012 | O'Neil et al. |
| 8,224,294 B2 | 7/2012 | Helferich |
| 8,295,450 B2 | 10/2012 | Helferich |
| 8,355,702 B2 | 1/2013 | Helferich |
| 8,374,585 B2 | 2/2013 | Helferich |
| 2007/0024908 A1* | 2/2007 | Hanechak .................. 358/1.18 |
| 2008/0095470 A1* | 4/2008 | Chao et al. .................. 382/298 |
| 2008/0198390 A1* | 8/2008 | Tanaka ........................ 358/1.2 |
| 2011/0090248 A1* | 4/2011 | Xiang ......................... 345/628 |
| 2011/0091132 A1* | 4/2011 | Kumar et al. ................ 382/298 |
| 2012/0120111 A1* | 5/2012 | Royal et al. ................. 345/660 |

* cited by examiner

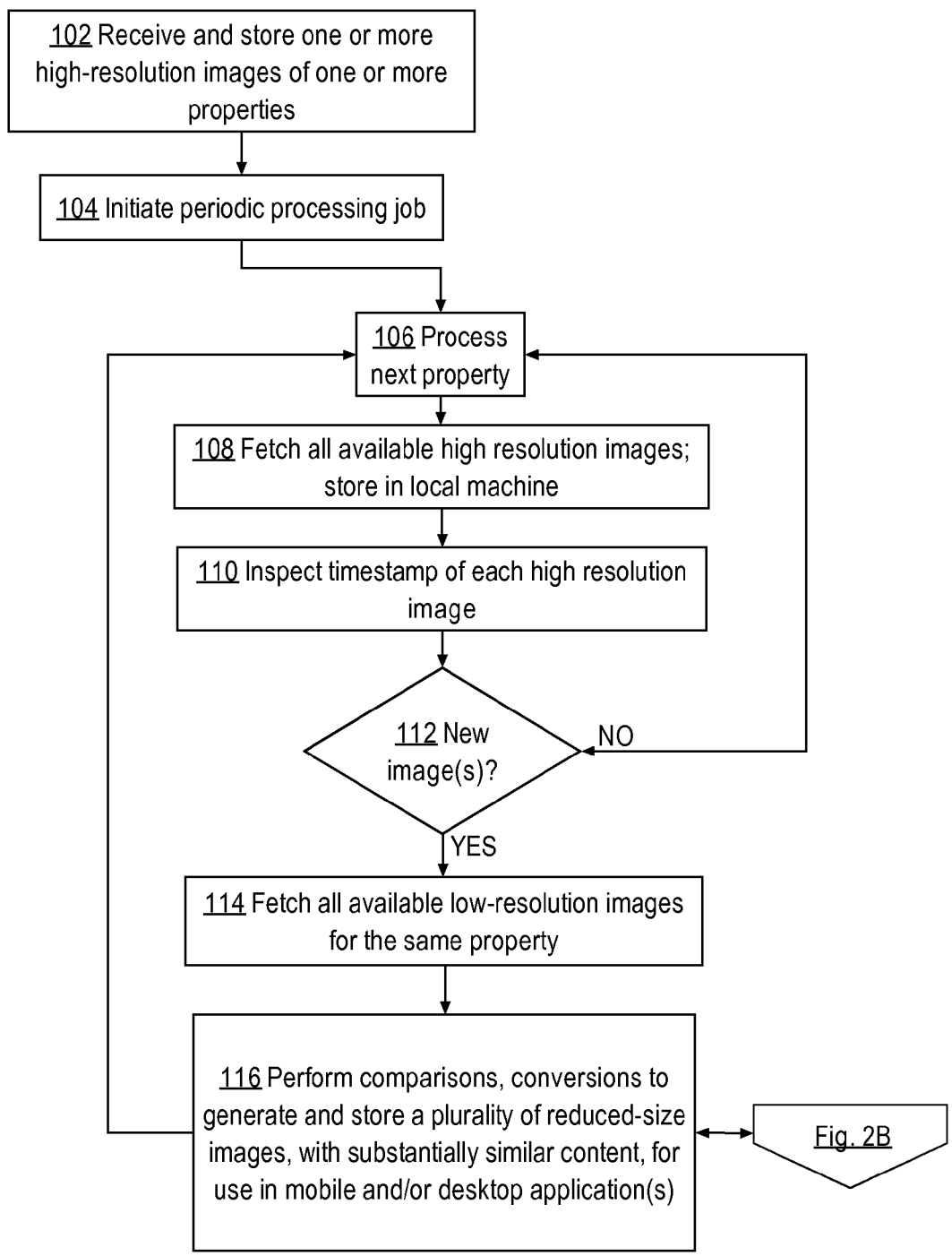

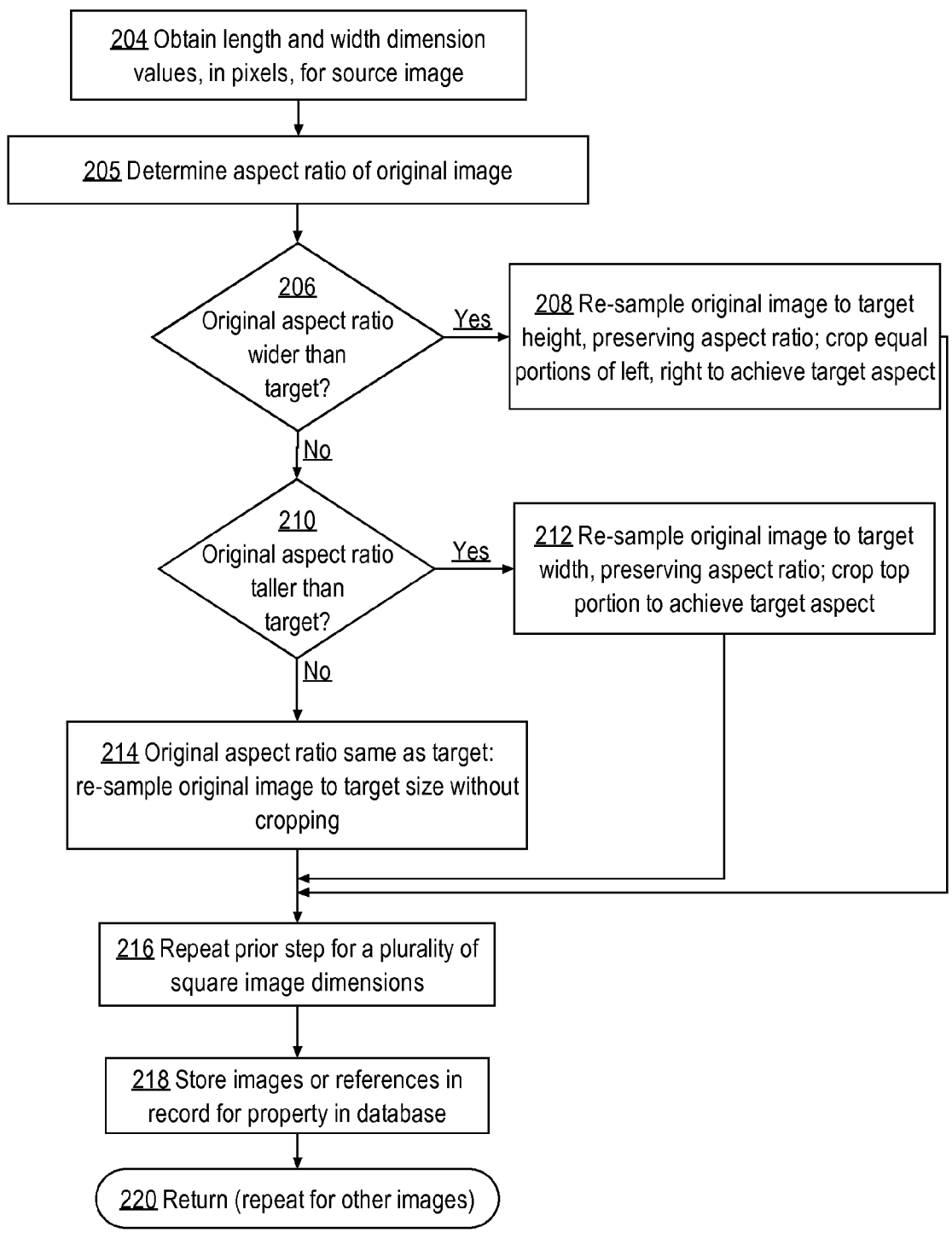

GENERATING MULTIPLE DIGITAL IMAGES WITH CHANGED ASPECT RATIO

TECHNICAL FIELD

The present disclosure generally relates to data processing. The disclosure relates more specifically to techniques for creating digital images that are substantially similar in content to, but reduced in size as compared to, a source image especially for use in the graphical user interface of mobile computing devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Online computer-based services now commonly offer applications and services intended for access by large-format computers, such as desktop computers and laptop computers, as well as for small-format computers, such as mobile computing devices including tablet computers and smartphones. For example, a particular web-based application may offer a standard site or application intended for use with large-format computers and a mobile site or application intended for use with small-format computers. Since the graphical displays of small-format computers are necessarily smaller, having the server-side computer deliver or use the same graphical images for both the large-format site or app and the small-format site or app becomes problematic. For example, it may be impossible for a small-format computer to display the same graphical image as used in a large-format site or application without requiring the user to drag or scroll the display to see all parts of the image.

Some online services are owned and operated by a first party, provided for the benefit of a second party such as a consumer end user, and permit contribution of content by third parties such as property owners. In this context, the services may sometimes permit the third parties to provide graphical images of their own selection for the purpose of illustrating property available for booking, rental or sale. Often the third parties contribute images independently and asynchronously with respect to activities of the first party. As a result, some of the images that the third parties contribute may be unsuitable for use with different kinds of application delivery mechanisms. For example, the third parties might contribute images that are too large or sized improperly for unmodified use in the small-format or mobile version of a particular service or application. In addition, the third parties might contribute images that cannot be used in different areas, pages or screens generated by an app that require displaying the same substantive content of an image in a different size or resolution in different places.

SUMMARY OF THE INVENTION

The appended claims may serve as a summary of the invention.

BRIEF DESCRIPTION OF THE DRAWINGS

In the drawings:

FIG. 2A illustrates an example process of generating a set of digital images based on previously obtained digital images.

FIG. 2B illustrates an example process of transforming digital images based on automatic size analysis, selection and cropping techniques.

DETAILED DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. General Overview

In an embodiment, a data processing method comprises receiving and storing one or more original graphic image files; for each particular original graphic image file among the graphic image files: determining a first aspect ratio of the particular original graphic image file; determining whether the first aspect ratio is wider, taller, or identical to a specified second aspect ratio associated with one or more target image files; creating and storing the one or more target image files each having the second aspect ratio, by re-sampling the particular original graphic image file to match a first dimension of the one or more target image files, and selectively cropping one or more portions of the particular original graphic image file to form the one or more target image files having the second aspect ratio; wherein the method is performed using one or more computing devices.

In another embodiment, one or more non-transitory computer-readable storage media store instructions which, when executed by one or more computing devices, cause performing receiving and storing one or more original graphic image files; for each particular original graphic image file among the graphic image files: determining a first aspect ratio of the particular original graphic image file; determining whether the first aspect ratio is wider, taller, or identical to a specified second aspect ratio associated with one or more target image files; creating and storing the one or more target image files each having the second aspect ratio, by re-sampling the particular original graphic image file to match a first dimension of the one or more target image files, and selectively cropping one or more portions of the particular original graphic image file to form the one or more target image files having the second aspect ratio.

Other embodiments, aspects and features will become apparent from the disclosure as a whole.

2. Structural & Functional Overview

Figure 1:
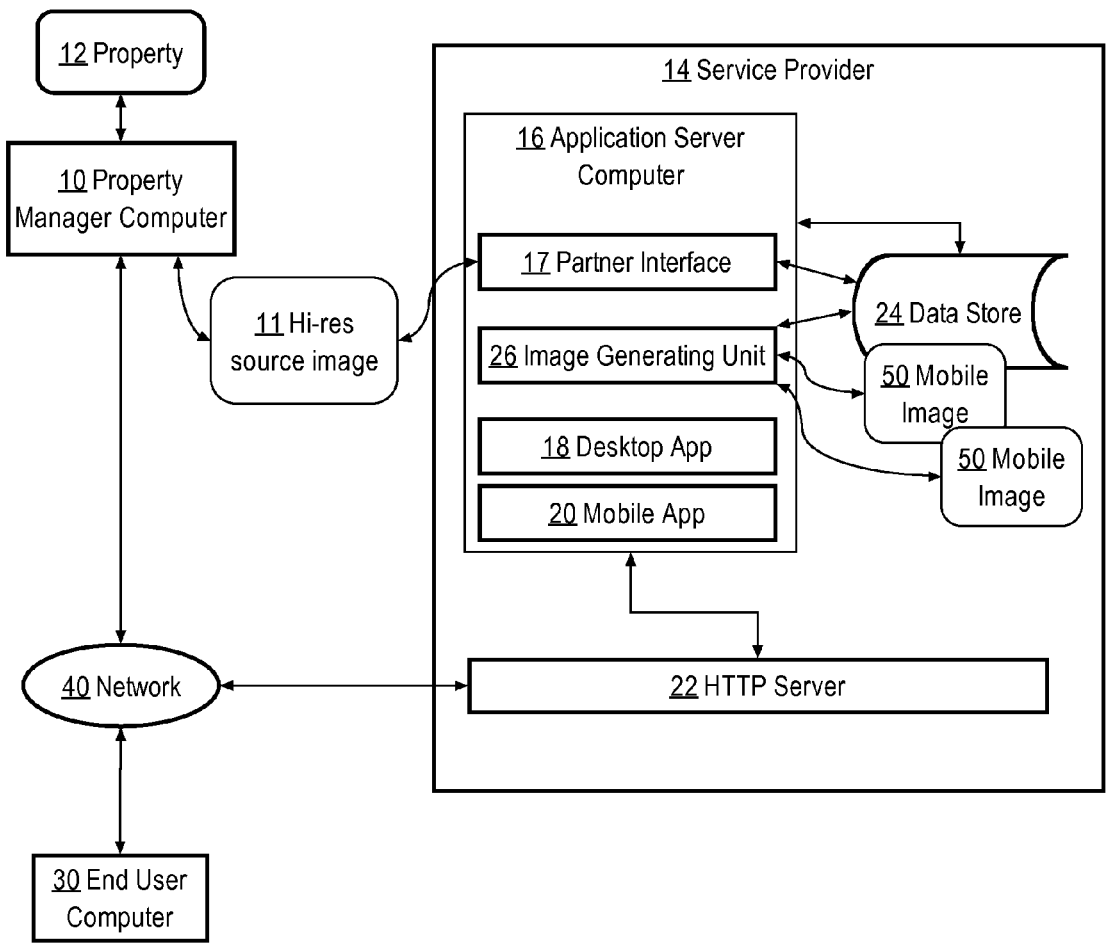
FIG. 1 illustrates an example data processing system that is configured to generate a set of digital images based on a previously obtained image.

FIG. 1 illustrates an example data processing system that is configured to generate a set of digital images based on a previously obtained image. In an embodiment, the system typically involves three parties or locations: a property manager computer 10 that is associated with one or more properties 12; a service provider 14 that owns, operates or manages an application server computer that hosts images of the properties; and an end user computer 30 associated with an end user who may be interested in obtaining information about the properties. The property manager computer 10, application server computer 16, and end user computer 30 may be coupled directly or indirectly using one or more local area networks, wide area networks, or internetworks using any of wired, wireless, terrestrial or satellite links, represented in FIG. 1 by network 40.

In an embodiment, property 12 is a hotel and property manager computer 10 is associated with an owner or manager of the hotel, or with a brand licensor or other entity having a contractual relationship to the hotel. Typically property manager computer 10 creates and stores at least one original image 11 depicting one or more aspects of the property 12. The property manager computer 10 may create any number of such images.

In an embodiment, end user computer 30 is used by an end user who is interested in obtaining information about the property 12; for example, the end user may be interested in evaluating the property for a possible hotel stay. End user computer 30 may be any of a mobile computing device such as a smartphone or tablet computer, laptop computer, desktop computer or other computing device.

Service provider 14 comprises an application server computer 16 configured with a partner interface 17, image generating unit 26, desktop app 18, and mobile app 20. Each of the elements of application server computer 16 may be implemented using one or more computer programs, other software elements, firmware or a combination thereof, in various embodiments. The application server computer 16 may be implemented as any number of distributed, clustered, or redundant server machines for load balancing or capacity purposes and may be coupled to one or more databases that store item data for a large number of items.

In one embodiment, the partner interface 17 is configured to provide a graphical user interface to the property manager computer, including authentication functions and image uploading and reviewing functions. In an embodiment, property manager computer 10 may contact application server computer 16, log in or provide security credentials, define or configure one or more properties such as hotels, and upload an original image 11 for one or more of the hotels. Thus, the property manager computer 10 is responsible for managing an inventory of properties, such as property 12, that are associated with the property manager computer 10 and that the application server computer 16 is to offer to end user computer for booking or other functions. In this context, the term "original image" indicates that the image 11 serves as a starting point for the processing techniques of this disclosure and to distinguish that original from target images that result from the processing technique, but is not intended to imply any requirement regarding originality in a creative sense.

In an embodiment, the image generating unit 26 is configured to analyze the original image 11 and generate one or more target images 50 in different sizes, resolutions, or with other characteristics that are suitable for use with the desktop app 18 and/or mobile app 20. For example, the target images 50 are optimized for display in mobile app 20 on a mobile computing device such as a smartphone or tablet computer, but optimization for a mobile device is not required. For example, target images 50 may have a reduced size, resolution or both in comparison to original image 11, or may conform to specified standards or criteria that enable displaying a large number of images received from different sources in a consistent manner within the user interfaces that the desktop app 18 and/or mobile app 20 provide. In one embodiment, target images 50 may comprise a plurality of copies of the original image 11 that reproduce the same substantive image content, but have different sizes, aspect ratios, and resolutions to permit displaying different images with the same general content in different locations, pages or screens of the desktop app 18 and/or mobile app 20. For example, if the original image 11 depicts the swimming pool of property 12, then the target images 50 may comprise a plurality of copies of the same swimming pool image but with different aspect ratios, sizes or resolutions. Specific image processing techniques that the image generating unit 26 can implement are further described in other sections herein.

In an embodiment, desktop app 18 and mobile app 20 represent different implementations of end user applications that may be downloaded to and run on different computing devices of end users, and that implement functions for viewing the property 12 using the target images 50. The desktop app 18 and mobile app 20 represent target platforms for the use of target images 50 that are derived from the original image 11.

In an embodiment, an HTTP server 22 and a data store 24 are coupled to the application server computer 16. The HTTP server 22 may be accessed from end user computer 30 using an HTTP browser to receive pages or screens that are generated by the desktop app 18 or mobile app 20. Data store 24 comprises any one or more of a relational database, object store, or filesystem capable of storing the target images 50 in association with data defining the property and with the original image 11. In an embodiment, data store 24 may essentially function as a catalog or directory of a large number of properties that the desktop app 18 and mobile app 20 can offer to end user computer 30 for browsing, inquiry, purchase or booking.

For example, some of the processes herein may be implemented using programs, scripts, and other software elements at the application server computer 16 that provide an online property booking service that is accessible using browsers or apps that are compatible with a network communication protocol such as HTTP. For purposes of illustrating clear examples, the description herein assumes that the items are physical properties, such as hotels. Thus, FIG. 1 may be implemented in the context of a hotel search and booking service that enables the computing device to search for, evaluate, select, and complete reservations or bookings for hotels. In other embodiments, the items may be any of accommodations other than hotels; airline flights; rental cars; restaurants; or any other commodity of commerce, product or service.

For purposes of illustrating a clear example, FIG. 1 shows one instance of the end user computer 30, property manager computer 10, and application server computer 16. In various embodiments, any number of such units may be used, and this disclosure specifically contemplates the use of multiple distributed computing units to implement application server computer 16 for the purpose of servicing up to millions of end user computers 30 and tens of thousands of properties 12.

FIG. 2A, FIG. 2B illustrate example processes of generating a set of digital images based on previously obtained digital images. The processes may be implemented, for example, in the form of image generating unit 26 of FIG. 1. Referring first to FIG. 2A, at 102, the process receives and stores one or more source images of one or more properties. For example, owners or managers of hotels or other properties 12 use local computers to upload high-resolution images of the properties to the application server computer 16 for storage in data store 24 in association with data defining and describing the properties. A particular property may be associated with any number of stored source images 11 for that property; for example, a property may include an exterior image, an image of a swimming pool or other exterior amenity, images of common areas such as lobbies, restaurants and bars, images of example rooms, etc. Typically each original image 11 is too large in pixel size or resolution for use directly within pages or screens that the apps 18, 20 generate for sending to end user computer 30. Alternatively, each original image 11 may be inconsistent with respect to aspect ratio (portrait, landscape), cropping, composition, emphasis, or other elements.

In some embodiments, the original image 11 is a high-resolution image, as compared to the target images 50. However, in various embodiments a difference in resolution is not required and the original image 11 may have the same resolution or lower resolution than the target images 50. For example, the original image 11 may differ from the target images 50 only in aspect ratio. Alternatively, the original image 11 may have a lower resolution than the target images 50. As further described, differences in pixel size or resolution may be addressed by re-sampling the original image 11 as part of creating the target images 50, with cropping or other changes to result in achieving a specified aspect ratio for the target images.

At 104, the process initiates a periodic processing job. For example, in one embodiment, a cron job wakes and executes according to a specified schedule to perform other steps as illustrated in FIG. 2A, FIG. 2B. Additionally or alternatively, operation 104 may be performed in response to operation 102; that is, in some embodiments the process of FIG. 1 may be triggered by detecting that a property manager computer 10 has uploaded a new image to the application server computer 16. In still another embodiment, a polling process is configured to scan the data store 24, or a particular folder in a filesystem or other storage location, to detect the presence of image files that are new, as indicated by timestamp; in response, initiation of the processing job at 104 occurs.

In various embodiments, the processing jobs may be implemented using application server computer 16 or using a local computer that is dedicated to performing the processes of FIG. 2A, FIG. 2B, for purposes of load balancing, separation of duties, or other engineering goals consistent with the operation of a large-scale online system.

Operations 106 to 116 inclusive represent a loop or iterative process that is performed for each property 12 that is defined in data store 24. Operation 106 represents an initiation point at which the process selects the next property 12 that is defined in data store 24. For that property, at 108, the process fetches all available source images and stores the images in the local computer that is performing the process. For example, all source images 11 associated with the property 12 are copied from the data store 24 to another computer that performs subsequent operations.

At 110, the process inspects a timestamp of the source images that have been obtained. If there are no new images, as determined by comparing the image timestamps to a stored time value indicating the last time that the process of FIG. 2A was performed, then control returns to 106 to select and process the next property. If any of the source images is new, then control transfers to 114 at which all available target images for the same property are retrieved such as target images 50 of FIG. 1.

At 116, the process performs one or more comparisons or conversions to generate and store a plurality of reduced size images, with substantially similar content, for use in the mobile app 18 and/or desktop app 20. In an embodiment, the process of FIG. 2B is used to implement operation 116. The effect of operations 114, 116 is to inspect all existing target images for the same property and to generate new target images only as needed. For example, if configuration data specifies that each property should be associated with target images that are 100×100, 200×200, and 300×300, and operation 114 indicates that a 300×300 image is already stored for the property, then operation 116 (and FIG. 2B) proceed only to produce a 100×100 and 200×200 image. In such a case, it is possible that the substantive content of the 100×100 and 200×200 images may depict different subject matter than the 300×300 image, which is deemed acceptable because properly sized images are available to display in the apps 18, 20 and because a reduction in processing time and use of resources will result.

FIG. 2B illustrates an example process of transforming digital images based on automatic size analysis, sampling and cropping techniques. In general, in an embodiment, the goal of the process of FIG. 2B is to create and store a plurality of copies of the source image in specified sizes while applying specified cropping and selection rules to ensure that all of the target image copies have approximately the same appearance, in terms of substantive content, even if their dimensions or aspect ratio are different. For example, the process may involve creating and storing, as target images 50 of FIG. 1, multiple copies of the original image 11 where each of the image copies conforms to a specified aspect ratio and pixel dimensions. In one particular approach, the dimensions are for target images that have a square aspect ratio, but the techniques herein can be used for target images with any desired aspect ratio. As a specific example, operation 202 could involve sampling original image 11 to result in a 200×200 image, a 400×400 image, and a 100×100 image, all stored in data store 24 in association with one another and with data defining the property 12. To illustrate a clear example, the process of FIG. 2B is specifically directed to producing a plurality of target images 50 having a specified target aspect ratio and pixel resolution regardless of the original aspect ratio, dimensions or orientation of the original image 11. In other embodiments, the target images 50 could be all rectangular with a specified aspect ratio (e.g., 3:4 or 16:9) and a specified orientation (portrait, landscape).

At 204, the process obtains length and width dimension values, in pixels, for the source image. For example, metadata values that are encoded into the original image 11 are inspected and the length and width values are extracted.

At 205, the process determines an aspect ratio of the original image as indicated by the length and width values. Thereafter, operations 206 to 214 are used to create target images based on re-sampling the original image and performing cropping depending on how the original aspect ratio relates to an aspect ratio of the target image.

At operation 206, the process tests whether the original aspect ratio of the original image 11 is wider than the aspect ratio of the target image. If so, then control transfers to operation 208 at which the original image is re-sampled to the height of the target image, while preserving the original aspect ratio, the process then crops equal sized portions of the left and right sides of the original image to result in a target image having the target aspect ratio. For example, if the original image has dimensions of 300×500 pixels, the process creates a 200×200 target image by cropping off parts of the left and right sides of the original image. Control then transfers to operation 216.

Figure 3A:
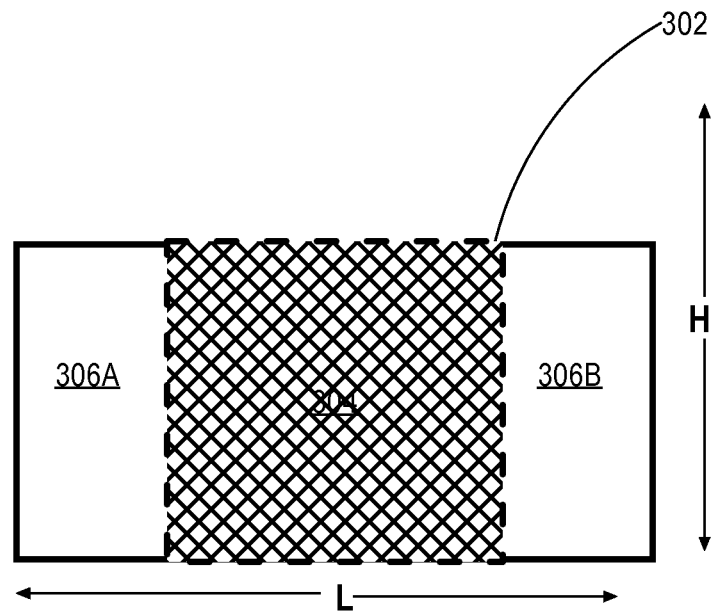
FIG. 3A illustrates an example transformation of an original image having an aspect ratio that is wider than the aspect ratio of a target image.

FIG. 3A illustrates an example transformation of an original image having an aspect ratio that is wider than the aspect ratio of a target image. In an embodiment, rectangle 302 represents in schematic form the original image 11. Rectangle 304 represents a target image with a square aspect ratio and overall dimensions in pixels that are smaller than the original. Using the approach described for FIG. 2A, FIG. 2B, the process recognizes from dimensional data for rectangle 302 that its aspect ratio is wider than the aspect ratio of the target image. Consequently, the original image is re-sampled to the height of the target image 304, and the left and right areas 306A, 306B are cropped or removed, to yield a target image that has the desired aspect ratio.

At 210 the process tests whether the original aspect ratio is taller than the aspect ratio of the target image. If so, then at 212, the process re-samples the original image to the target image width, preserving the original aspect ratio, and crops off a top portion of the original image to achieve the target aspect ratio. Control proceeds to 216.

Figure 3B:
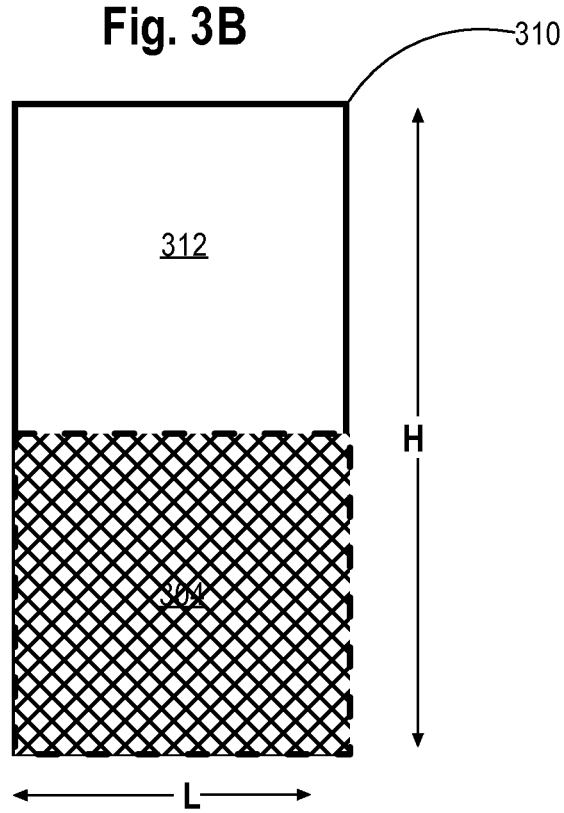
FIG. 3B illustrates an example transformation of an original image having an aspect ratio that is talker than the aspect ratio of the target image.
Figure 4:
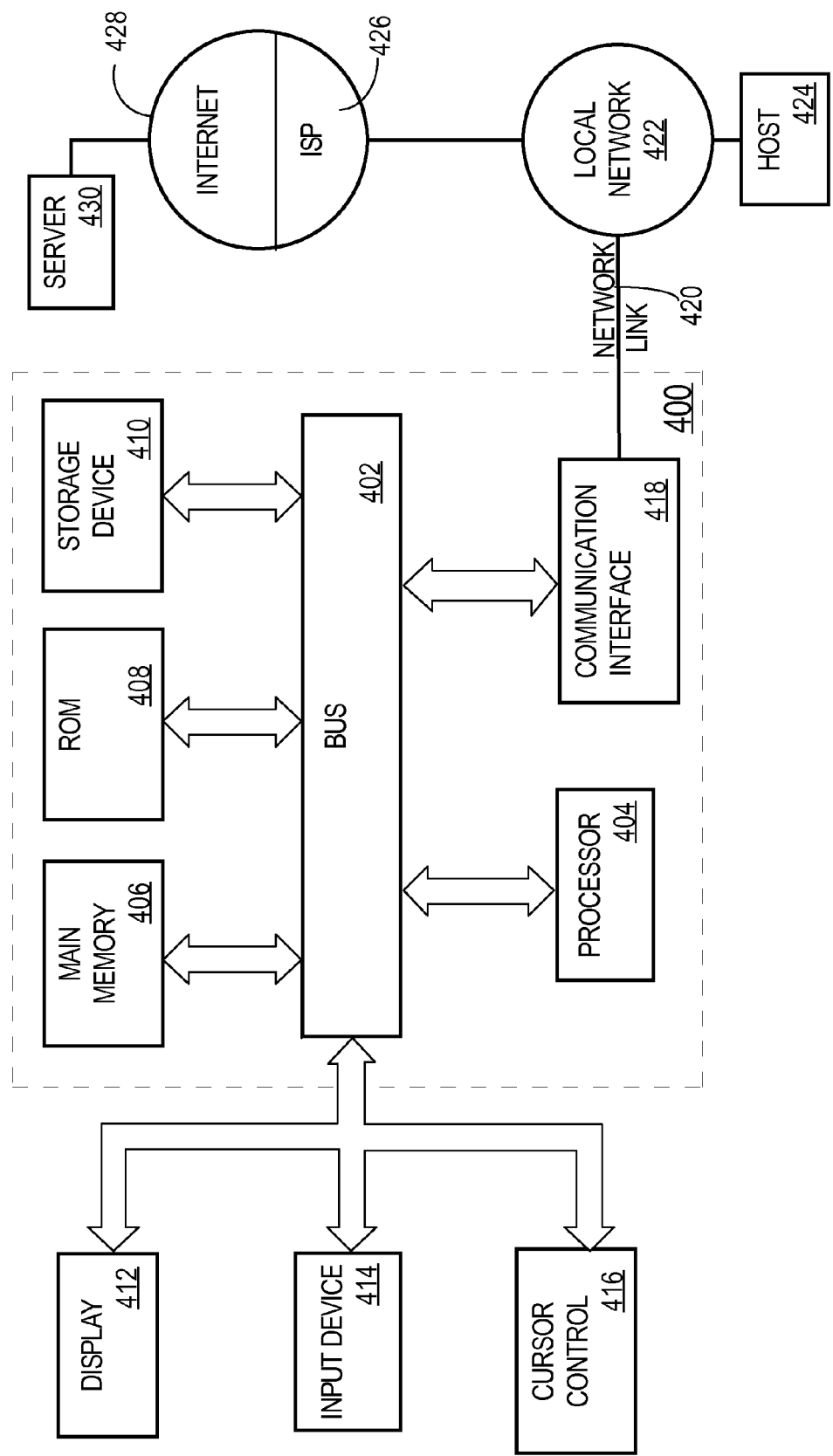
FIG. 4 illustrates an example computer system with which embodiments may be used.

FIG. 3B illustrates an example transformation of an original image having an aspect ratio that is taller than the aspect ratio of the target image. In an embodiment, rectangle 310 represents in schematic form the original image 11. Rectangle 304 represents a target image having square aspect ratio different than the taller aspect ratio of rectangle 310. Using the approach described for FIG. 2A, FIG. 2B, the process recognizes from dimensional data for rectangle 310 that its aspect ratio is taller than an aspect ratio of the target image. Consequently, the original image is re-sampled to the width of the target image, and the top area 312 is cropped or removed, to yield one or more target images 50 that are square and have the desired aspect ratio.

If the test of operation 210 is false, then the original image has the same aspect ratio as the target image. Therefore, at 214, the process creates the target image by re-sampling the original image to the target size without cropping. For example, if the original image 11 is 400×400, and the mobile image 50 is to be 200×200, then the process would re-sample the original image using a sampling rate or algorithm that selects 200×200 pixels of the original image for the target image.

At 216, the process repeats whichever prior operation 208, 212, or 214 had been used to create multiple target images 50 for a plurality of different square image dimensions. For example, target images 50 may be created in sizes of 100× 100, 200×200, and 300×300 pixels; while these example sizes reflect a square aspect ratio, any other desired aspect ratio could be achieved.

At 218, the image files, or references to the images, are stored in a record for the property 12 in the data store 24. The particular schema, format or arrangement used for data storage is not critical. Operation 220 indicates completion of an iteration of the process of FIG. 2A, FIG. 2B, which may be repeated for all other images for the property 12, and for all other properties that are defined in the data store.

In addition to performing cropping as shown, the processes of FIG. 2A, FIG. 2B may include operations to modify characteristics of the original image 11, when copied into multiple target images 50, other than dimensions and aspect ratio. For example, encoding, compression, saturation, contrast, or tint may be varied depending on the needs or requirements of the mobile app 18 or desktop app 20.

As a result, the processes herein can efficiently create and store a plurality of images that are optimized in size for particular kinds of software applications even when a third party who provides the original image 11 is unaware of the requirements. Further, the processes herein can automatically create a set of images that are identical in content to the original image, but have optimized dimensions or other characteristics, without the involvement of the party that is providing the original images. For example, a property owner can simply upload whatever property images are available, without conforming to requirements or standards for size or resolution, and can rely on the automatic processes herein to customize copies of the original image to fit image locations within screens, pages, or other elements of a user interface that the mobile app 18 or the desktop app 20 generate. Even when the data store 24 contains thousands or millions of images for a large number of properties 12, the processes herein may be run during an off-peak time, or using a dedicated computer, to generate sets of mobile images that can be used in subsequent instantiation of the mobile app 18 or desktop app 20.

3. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

4. Other Disclosure

1. A method comprising: receiving and storing one or more original graphic image files; for each particular original graphic image file among the graphic image files: determining a first aspect ratio of the particular original graphic image file; determining whether the first aspect ratio is wider, taller, or identical to a specified second aspect ratio associated with one or more target image files; creating and storing the one or more target image files each having the second aspect ratio, by re-sampling the particular original graphic image file to match a first dimension of the one or more target image files, and selectively cropping one or more portions of the particular original graphic image file to form the one or more target image files having the second aspect ratio; wherein the method is performed using one or more computing devices.

2. The method of clause 1, wherein the selectively cropping comprises, when the first aspect ratio is wider than the second aspect ratio, re-sampling the particular original graphic image to a height of the one or more target image files while preserving the first aspect ratio, and cropping equal left and right portions of the particular original graphic image file to achieve the second aspect ratio.

3. The method of clause 1, wherein the selectively cropping comprises, when the first aspect ratio is wider taller than the second aspect ratio, re-sampling the particular original graphic image to a width of the one or more target image files while preserving the first aspect ratio, and cropping a top portion of the particular original graphic image file to achieve the second aspect ratio.

4. The method of clause 1, further comprising providing the one or more target image files to a first computer program application configured for a mobile computing device and providing the original graphic image file to a second computer program application that is configured for a non-mobile computing device.

5. The method of clause 1 wherein the original graphic image files and the one or more target image files are for physical properties.

6. The method of clause 1 wherein the original graphic image files and the one or more target image files are for hotels.

7. The method of clause 1 wherein the original graphic image file comprises a first image resolution that is lower than a second image resolution of the one or more target image files.

8. The method of clause 1 comprising repeating the determining, creating and storing for two or more target image files, wherein each of the two or more target image files has different dimensions in pixels than all others of the two or more target image files, wherein each of the two or more target image files has the second aspect ratio.

9. The method of clause 1 further comprising: receiving a second original graphic image file having a third aspect ratio that equals the second aspect ratio of the one or more target image files; creating and storing the one or more target image files each having the second aspect ratio by re-sampling the second original graphic image file without selectively cropping.

10. One or more non-transitory computer-readable storage media storing instructions which, when executed by one or more computing devices, cause performing: receiving and storing one or more original graphic image files; for each particular original graphic image file among the graphic image files: determining a first aspect ratio of the particular original graphic image file; determining whether the first aspect ratio is wider, taller, or identical to a specified second aspect ratio associated with one or more target image files; creating and storing the one or more target image files each having the second aspect ratio, by re-sampling the particular original graphic image file to match a first dimension of the one or more target image files, and selectively cropping one or more portions of the particular original graphic image file to form the one or more target image files having the second aspect ratio.

11. The one or more non-transitory computer-readable storage media of clause 10, wherein the instructions which when performed cause selectively cropping comprise instructions which when performed cause, when the first aspect ratio is wider than the second aspect ratio, re-sampling the particular original graphic image to a height of the one or more target image files while preserving the first aspect ratio, and cropping equal left and right portions of the particular original graphic image file to achieve the second aspect ratio.

12. The one or more non-transitory computer-readable storage media of clause 10, wherein the instructions which when performed cause selectively cropping comprise instructions which when performed cause, when the first aspect ratio is wider taller than the second aspect ratio, re-sampling the particular original graphic image to a width of the one or more target image files while preserving the first aspect ratio, and cropping a top portion of the particular original graphic image file to achieve the second aspect ratio.

13. The one or more non-transitory computer-readable storage media of clause 10, further comprising instructions which when performed cause providing the one or more target image files to a first computer program application configured for a mobile computing device and providing the original graphic image file to a second computer program application that is configured for a non-mobile computing device.

14. The one or more non-transitory computer-readable storage media of clause 10 wherein the original graphic image files and the one or more target image files are for physical properties.

15. The one or more non-transitory computer-readable storage media of clause 10 wherein the original graphic image files and the one or more target image files are for hotels.

16. The one or more non-transitory computer-readable storage media of clause 10 wherein the original graphic image file comprises a first image resolution that is lower than a second image resolution of the one or more target image files.

17. The one or more non-transitory computer-readable storage media of clause 10 comprising instructions which when performed cause repeating the determining, creating and storing for two or more target image files, wherein each of the two or more target image files has different dimensions in pixels than all others of the two or more target image files, wherein each of the two or more target image files has the second aspect ratio.

18. The one or more non-transitory computer-readable storage media of clause 10 further comprising instructions which when performed cause: receiving a second original graphic image file having a third aspect ratio that equals the second aspect ratio of the one or more target image files; creating and storing the one or more target image files each having the second aspect ratio by re-sampling the second original graphic image file without selectively cropping.

5. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    at a computer device, receiving and storing a plurality of original graphic image files each received from a different source and each having a different original aspect ratio that is different than a single specified second aspect ratio to which all the original graphic image files need to be transformed;
    for each particular original graphic image file among the graphic image files:
    determining a first aspect ratio of that particular original graphic image file;
    determining whether the first aspect ratio is wider, taller, or identical to the second aspect ratio to be used with a plurality of target image files;
    creating and storing a copy of the particular original graphic image file as one of the plurality of target image files using the second aspect ratio, by:
    using the computer device, automatically determining whether the first aspect ratio is wider than the second aspect ratio, and if so, using the computer device automatically re-sampling the particular original graphic image file to match a first dimension of the one or more target image files, and using the computer device automatically selectively cropping one or more left or right portions of the particular original graphic image file to form the one or more target image files having the second aspect ratio;

using the computer device, automatically determining whether the first aspect ratio is taller than the second aspect ratio, and if so, using the computer device automatically re-sampling the particular original graphic image file to match a second dimension of the one or more target image files, and using the computer device automatically selectively cropping a top portion of the particular original graphic image file to form the one or more target image files having the second aspect ratio;

wherein the method is performed using one or more computing devices.

2. The method of claim 1, wherein the selectively cropping comprises, when the first aspect ratio is wider than the second aspect ratio, re-sampling the particular original graphic image to a height of the one or more target image files while preserving the first aspect ratio, and cropping equal left and right portions of the particular original graphic image file to achieve the second aspect ratio.

3. The method of claim 1, wherein the selectively cropping comprises, when the first aspect ratio is taller than the second aspect ratio, re-sampling the particular original graphic image to a width of the one or more target image files while preserving the first aspect ratio, and cropping a top portion of the particular original graphic image file to achieve the second aspect ratio.

4. The method of claim 1, further comprising providing the one or more target image files to a first computer program application configured for a mobile computing device and providing the original graphic image file to a second computer program application that is configured for a non-mobile computing device.

5. The method of claim 1 wherein the original graphic image files and the one or more target image files are for physical properties.

6. The method of claim 1 wherein the original graphic image files and the one or more target image files are for hotels.

7. The method of claim 1 wherein the original graphic image file comprises a first image resolution that is lower than a second image resolution of the one or more target image files.

8. The method of claim 1 comprising repeating the determining, creating and storing for two or more target image files, wherein each of the two or more target image files has different dimensions in pixels than all others of the two or more target image files, wherein each of the two or more target image files has the second aspect ratio.

9. The method of claim 1 further comprising:
receiving a second original graphic image file having a third aspect ratio that equals the second aspect ratio of the one or more target image files;
creating and storing the one or more target image files each having the second aspect ratio by re-sampling the second original graphic image file without selectively cropping.

10. One or more non-transitory computer-readable storage media storing instructions which, when executed by one or more computing devices, cause performing:
at a computer device, receiving and storing a plurality of original graphic image files each received from a different source and each having a different original aspect ratio that is different than a single specified second aspect ratio to which all the original graphic image files need to be transformed;
for each particular original graphic image file among the graphic image files:

determining a first aspect ratio of that particular original graphic image file;
determining whether the first aspect ratio is wider, taller, or identical to the second aspect ratio to be used with a plurality of target image files;
creating and storing a copy of the particular original graphic image file as one of the plurality of target image files using the second aspect ratio, by:
using the computer device, automatically determining whether the first aspect ratio is wider than the second aspect ratio, and if so, using the computer device automatically re-sampling the particular original graphic image file to match a first dimension of the one or more target image files, and using the computer device automatically selectively cropping one or more left or right portions of the particular original graphic image file to form the one or more target image files having the second aspect ratio;
using the computer device, automatically determining whether the first aspect ratio is taller than the second aspect ratio, and if so, using the computer device automatically re-sampling the particular original graphic image file to match a second dimension of the one or more target image files, and using the computer device automatically selectively cropping a top portion of the particular original graphic image file to form the one or more target image files having the second aspect ratio.

11. The one or more non-transitory computer-readable storage media of claim 10, wherein the instructions which when performed cause selectively cropping comprise instructions which when performed cause, when the first aspect ratio is wider than the second aspect ratio, re-sampling the particular original graphic image to a height of the one or more target image files while preserving the first aspect ratio, and cropping equal left and right portions of the particular original graphic image file to achieve the second aspect ratio.

12. The one or more non-transitory computer-readable storage media of claim 10, wherein the instructions which when performed cause selectively cropping comprise instructions which when performed cause, when the first aspect ratio is taller than the second aspect ratio, re-sampling the particular original graphic image to a width of the one or more target image files while preserving the first aspect ratio, and cropping a top portion of the particular original graphic image file to achieve the second aspect ratio.

13. The one or more non-transitory computer-readable storage media of claim 10, further comprising instructions which when performed cause providing the one or more target image files to a first computer program application configured for a mobile computing device and providing the original graphic image file to a second computer program application that is configured for a non-mobile computing device.

14. The one or more non-transitory computer-readable storage media of claim 10 wherein the original graphic image files and the one or more target image files are for physical properties.

15. The one or more non-transitory computer-readable storage media of claim 10 wherein the original graphic image files and the one or more target image files are for hotels.

16. The one or more non-transitory computer-readable storage media of claim 10 wherein the original graphic image file comprises a first image resolution that is lower than a second image resolution of the one or more target image files.

17. The one or more non-transitory computer-readable storage media of claim 10 comprising instructions which when performed cause repeating the determining, creating and storing for two or more target image files, wherein each of the two or more target image files has different dimensions in pixels than all others of the two or more target image files, wherein each of the two or more target image files has the second aspect ratio.

18. The one or more non-transitory computer-readable storage media of claim 10 further comprising instructions which when performed cause:
- receiving a second original graphic image file having a third aspect ratio that equals the second aspect ratio of the one or more target image files;
- creating and storing the one or more target image files each having the second aspect ratio by re-sampling the second original graphic image file without selectively cropping.

* * * * *